United States Patent
Ling et al.

(10) Patent No.: US 11,075,381 B2
(45) Date of Patent: Jul. 27, 2021

(54) BORON-DOPED GRAPHENE SHEET AS SODIUM-ION BATTERY ANODE

(71) Applicant: Toyota Motor Engineering & Manufacturing North America, Inc., Erlanger, KY (US)

(72) Inventors: Chen Ling, Ann Arbor, MI (US); Fuminori Mizuno, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 16/447,168

(22) Filed: Jun. 20, 2019

(65) Prior Publication Data

US 2019/0305312 A1    Oct. 3, 2019

Related U.S. Application Data

(62) Division of application No. 14/090,143, filed on Nov. 26, 2013, now abandoned.

(51) Int. Cl.

| | |
|---|---|
| *H01M 4/00* | (2006.01) |
| *H01M 4/587* | (2010.01) |
| *H01M 10/054* | (2010.01) |
| *H01M 4/133* | (2010.01) |
| H01M 4/38 | (2006.01) |
| H01M 4/02 | (2006.01) |

(52) U.S. Cl.
CPC ........... *H01M 4/587* (2013.01); *H01M 4/133* (2013.01); *H01M 10/054* (2013.01); *H01M 4/381* (2013.01); *H01M 2004/021* (2013.01)

(58) Field of Classification Search
CPC .... H01M 4/587; H01M 4/133; H01M 10/054; H01M 2004/021; H01M 4/381
See application file for complete search history.

(56) References Cited

U.S. PATENT DOCUMENTS

| | | |
|---|---|---|
| 5,229,226 A | 7/1993 | Bito |
| 2010/0035150 A1 | 2/2010 | Ando |
| 2012/0021273 A1* | 1/2012 | Ohmori ............... H01M 50/449 429/144 |
| 2012/0052387 A1 | 3/2012 | Sung |
| 2012/0064409 A1 | 3/2012 | Zhamu |

(Continued)

FOREIGN PATENT DOCUMENTS

| | | |
|---|---|---|
| CN | 102760861 | 10/2012 |
| JP | 2013-20749 | 1/2013 |

OTHER PUBLICATIONS

Meng et al., "First principles computational materials design for energy storage materials in lithium ion batteries", Energy Environ. Sci., vol. 2, 2009, pp. 589-609.

(Continued)

*Primary Examiner* — Nicholas P D'Aniello
(74) *Attorney, Agent, or Firm* — Oblon, McClelland, Maier & Neustadt, L.L.P.

(57) ABSTRACT

A sodium-ion battery having a boron-doped graphene sheet as an anode active material is provided. The boron-doped graphene sheet is of formula $B_xC_y$, where x and y satisfy a relation of x+y=4, and x is a number larger than 0 and less than or equal to 1.

9 Claims, 6 Drawing Sheets

(56) References Cited

U.S. PATENT DOCUMENTS

| | | | |
|---|---|---|---|
| 2012/0171574 | A1 | 7/2012 | Zhamu |
| 2012/0177995 | A1* | 7/2012 | Sun .................. B82Y 30/00 429/231.8 |
| 2013/0022873 | A1 | 1/2013 | Von Bulow et al. |
| 2013/0045156 | A1 | 2/2013 | Nomoto et al. |
| 2013/0059174 | A1 | 3/2013 | Zhamu |
| 2013/0059195 | A1 | 3/2013 | Kuriki et al. |
| 2013/0089790 | A1 | 4/2013 | Byon et al. |
| 2013/0164612 | A1 | 6/2013 | Tanemura et al. |
| 2013/0171502 | A1 | 7/2013 | Chen et al. |
| 2014/0065456 | A1 | 3/2014 | Bhavaraju |

OTHER PUBLICATIONS

Persson et al., "Thermodynamic and kinetic properties of the Li-graphite system from first-principles calculations", Phys. Rev. B, vol. 82, 125416, 2010, 9 pages.

Komaba et al., "Electrochemical Na Insertion and Solid Electrolyte Interphase for Hard-Carbon Electrodes and Application to Na-Ion Batteries", Adv. Funct. Matter., vol. 21, 2011, pp. 3859-3867.

Qian et al., "High capacity Na-storage and superior cyclability of nanocomposite Sb/C anode for Na-ion batteries", Chem. Commun., vol. 48, 2012. pp. 7070-7072.

Darwiche et al., "Better Cycling Performances of Bulk Sb in Na-Ion Batteries Compared to Li-Ion Systems: An Unexpected Electrochemical Mechanism", J. Am. Chem. Soc.,vol. 134, 2012, pp. 20805-20811.

Senguttuvan et al., Low-Potential Sodium Insertion in a NASICON-Type Structure through the Ti(III)/Ti(II) Redox Couple . J. Am. Chem. Soc., vol. 135, 2013, pp. 3897-3903.

Sun et al., "Direct atomic-scale confirmation of three-phase storage mechanism in $Li_4Ti_5O_{12}$ anodes for room-temperature sodium-ion batteries", Nature Commun., vol. 4, No. 1870, 2013, pp. 1-10.

Zhu et al., "Tin Anode for Sodium-Ion Batteries Using Natural Wood Fiber as a Mechanical Buffer and Electrolyte Reservoir", Nano Lett., vol. 13, 2013, pp. 3093-3100.

Palomares et al., "Na-ion batteries, recent advances and present challenges to become low cost energy storage systems", Energy Environ. Sci., vol. 5, 2012, pp. 5884-5901.

Liu et al., "Feasibility of Lithium Storage on Graphene and Its Derivatives", J. Phys. Chem. Lett., vol. 4, 2013, pp. 1737-1742.

Slater et al., "Sodium-Ion Batteries", Adv. Funct. Mater., vol. 23, 2013, pp. 947-958.

Way, et al., "The Effects of Boron Substitution in Carbon on the Intercalation of Lithium in $Li_x(B_zC_{1-z})_6$" J. Electrochem. Soc., vol. 141, No. 4, Apr. 1994, pp. 907-912.

Kaseda, et al., "Preparation of Electrochemical Characterization of Boron/carbon Material as an Anode of Sodium Ion Battery", Annual World Conference on Carbon—Carbon 2013 (Carbon 2013), Rio de Janeiro, Brazil, Jul. 14-19, 2013, 2 pages.

Wu et al., "Doped Graphene Sheets as Anode Materials with Superhigh Rate and Large Capacity for Lithium Ion Batteries", ACS Nano, 2011, 5 (7), pp. 5463-5471, published Jun. 22, 2011 (Year: 2011).

* cited by examiner

US 11,075,381 B2

BORON-DOPED GRAPHENE SHEET AS SODIUM-ION BATTERY ANODE

CROSS REFERENCE TO RELATED APPLICATION(S)

The present application is a divisional of U.S. patent application Ser. No. 14/090,143, filed on Nov. 26, 2013, the entire disclosure of which is incorporated herein by reference.

BACKGROUND

The present invention is directed to the field of energy storage devices, and more specifically, to rechargeable sodium-ion batteries. In particular, the present invention relates to a sodium-ion battery having a boron-doped graphene sheet anode.

Energy conversion and storage have become more and more important in transportation, commercial and residential applications. In particular, large-scale implementation of renewable energy and the next generation of electric vehicles require development of inexpensive and efficient energy storage systems.

Among the various energy storage technologies, lithium-ion battery appears to offer a possible solution. Indeed, lithium-ion battery has been dominating the market of portable electronic devices since its first commercial use in 1991. The technology associated with the construction and composition of the lithium ion battery has been the subject of investigation and improvement and has matured to an extent where a state of art lithium ion battery is reported to have up to 700 Wh/L of energy density. However, even the most advanced lithium ion battery technology is not considered to be viable as a power source capable to meet the demands for a commercial electric vehicle (EV) in the future. For example, for a 300 mile range EV to have a power train equivalent to current conventional internal combustion engine vehicles, an EV battery pack having an energy density of approximately 2000 Wh/L is required. As this energy density is close to the theoretical limit of a lithium ion active material, technologies which can offer battery systems of higher energy density are under investigation. In addition, the use of lithium-ion batteries in large scale applications is also challenged by the increasingly high cost of lithium and the potential supply risk. Therefore, low-cost, high-capacity, and safe alternatives that are not resource-limited are of particular interest in this field.

Sodium, whose intercalation chemistry is similar to lithium and which is an element with lower cost and higher abundance than lithium, has thus gained much interest recently. The concept of a battery based on sodium is similar to that of a lithium-ion battery in that a sodium-ion battery also involves the energy carried by the reversible transport of an ion ($Na^+$) between the positive and negative electrodes. However, the reaction mechanism in a sodium-ion cell may be significantly different from the mechanism in a lithium-ion cell. Indeed, the real performance of a specific material in a sodium-ion cell may be distinct from its performance in a lithium counterpart. For instance, graphite, the commercial anode active material in lithium-ion batteries, cannot accommodate the insertion of Na to a concentration higher than $Na_{0.0625}C_6$ and is electrochemically irreversible. As a result, graphite is unsuitable as a sodium-ion battery anode. Such performance differences between a lithium cell and a sodium cell may be explained by the fundamental differences between lithium and sodium. For example, sodium is more than 3 times larger in mass than lithium; $Na^+$ is about 0.3 Å larger than $Li^+$; and sodium has a standard reduction potential about 300 mV higher than lithium. These fundamental differences dictate that it may be impossible to simply adopt the knowledge and the techniques developed for lithium-ion batteries to sodium-ion batteries despite the similarities between sodium-ion batteries and lithium-ion batteries. Appropriate electrode and electrolyte materials that can be used in practical systems need to be developed for sodium-ion batteries.

A variety of successful cathode active materials for sodium-ion batteries have been reported, thanks to the technology initially developed for lithium-ion batteries. By contrast, the identification of a suitable anode active material for the sodium-ion battery is the area where analogy to its lithium counterpart is the least applicable. The primary choice of sodium-ion battery anode in the lab-test is hard carbon, whose capacity (300 mAh/g) is slightly lower than that of the graphite anode in the lithium-ion battery. However, the low sodiation voltage of hard carbon (~0.01 V vs $Na/Na^+$) raises safety concerns because of dendrite formation on the anode surface during sodium metal formation. Alloy anodes such as Sn and Sb exhibit good capacity for the insertion of Na. But the pulverization due to the large volume expansion upon sodium insertion potentially damages their long cycling performance. Intercalation materials such as lithium titanate and sodium titanate have been reported to have a Na insertion potential as low as 0.3 V vs $Na/Na^+$. However, the capacity of these intercalation materials is typically less than 300 mAh/g; and their cyclability still remains as a challenge in practical applications. A good sodium-ion battery anode active material, which provides high energy density, good cyclability, good rate capability, and appropriate sodiation voltage to avoid dendrite formation, is yet to be developed.

In view of these problems, an object of the present invention is to provide a sodium-ion battery with a better anode material than hard carbon. Another object is to provide an anode material for sodium-ion batteries that has high energy density. Another object is to provide an anode material for sodium-ion batteries that has a higher sodiation voltage than the hard carbon anode so that the battery has less safety concerns. Another object is to provide an anode material whose volume barely changes during cycling. Another object is to provide an anode material that has high electronic mobility and Na mobility. These and other objects have been achieved according to the present invention.

SUMMARY

In one embodiment of the present invention, the sodium-ion battery comprises an anode comprising a boron-doped graphene sheet as an anode active material, a cathode, and an electrolyte comprising a sodium salt.

In another embodiment, the cathode comprises sodium.

In another embodiment, the boron-doped graphene sheet comprises sodium adsorbed to the graphene sheet.

In another embodiment, sodium adsorption may occur on a single side or both sides of the graphene sheet.

In another embodiment, the boron-doped graphene sheet comprises boron in a positive amount of up to 25 mol %, based on a total molar amount of boron and carbon in the boron-doped graphene sheet.

In another embodiment, the boron-doped graphene sheet is $B_{0.5}C_{3.5}$.

In another embodiment, the maximum sodium concentration adsorbed on a single side of the $B_{0.5}C_{3.5}$ boron-doped graphene sheet reaches $Na_{0.625}(B_{0.5}C_{3.5})$, which corresponds to a capacity of up to 353 mAh/g.

In another embodiment, the maximum sodium concentration adsorbed on both sides of the $B_{0.5}C_{3.5}$ boron-doped graphene sheet reaches $Na_{0.75}(B_{0.5}C_{3.5})$, which corresponds to a capacity of up to 423 mAh/g.

In another embodiment, the boron-doped graphene sheet is $BC_3$.

In another embodiment, the maximum sodium concentration adsorbed on a single side of the BC boron-doped graphene sheet reaches $Na_{1.125}(BC_3)$, which corresponds to a capacity of up to 648 mAh/g.

In another embodiment, the maximum sodium concentration adsorbed on both sides of the $BC_3$ boron-doped graphene sheet reaches $Na_{1.33}(BC_3)$, which corresponds to a capacity of up to 762 mAh/g.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
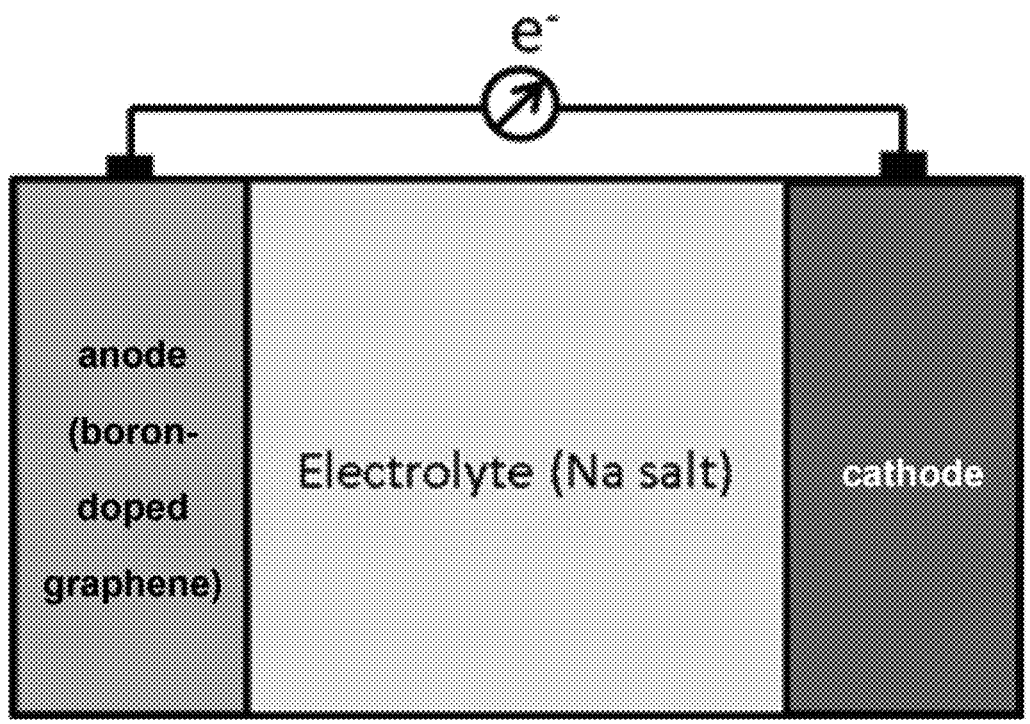
FIG. 1 schematically shows a construction of a sodium-ion battery with a boron-doped graphene sheet as an anode active material.

Throughout this description all ranges described include all values and sub-ranges therein, unless otherwise specified. Additionally, the indefinite article "a" or "an" carries the meaning of "one or more" throughout the description, unless otherwise specified. "A boron-doped graphene sheet" in this description means a graphene sheet with carbon atoms in the graphene sheet substituted by boron atoms.

An anode material of a sodium-ion battery of the present invention comprises a boron-doped graphene sheet. Graphene sheet is attractive to be used as an electrode material for rechargeable batteries because of its widely accessible surface area. However, a pristine graphene sheet is relatively inactive because the binding between Na and the graphene surface is too weak for a sufficient sodium adsorption. After conducting a wide scale study and evaluations of various compositions of graphene-based materials which may function as an anode active material for a sodium-ion battery, the inventors have surprisingly discovered that a boron-doped graphene sheet is a promising anode active material for a rechargeable sodium-ion battery, because the boron-doped graphene sheet has high energy density, good cyclability, good rate capability, and appropriate sodiation voltage.

Table 1 compares the performance of a boron-doped graphene sheet ($BC_3$) and other sodium-ion anode materials that have been reported. The energy density in Table 1 is calculated with a cathode voltage at 3.4 V.

TABLE 1

| anode | sodiation voltage (V vs $Na/Na^+$) | capacity (mAh/g) | energy density (Wh/kg) | volumetric expansion | diffusion barrier (eV) |
|---|---|---|---|---|---|
| hard carbon*[a] | 0.01 | 300 | 1017 | ~0% | |
| tin*[b] | 0.20 | 845 | 2704 | 318% | |
| antimony*[c] | 0.58 | 659 | 1858 | 285% | |
| titanate*[d] | 0.3 | 300 | 930 | ~10% | 0.25-0.41 |
| $BC_3$ boron-doped graphene | 0.44 | 762 | 1256 | ~0% | 0.16-0.28 |

*[a]Komaba et al., "Electrochemical Na Insertion and Solid Electrolyte Interphase for Hard-Carbon Electrodes and Application to Na-Ion Batteries," Adv. Func. Mater. 21, 3859, 2011.
*[b]Zhu et al., "Tin Anode for Sodium-Ion Batteries Using Natural Wood Fiber as a Mechanical Buffer and Electrolyte Reservoir," Nano Lett., 13, 3093, 2013.
*[c]Qian et al., "High capacity of Na-storage and superior cyclability of nanocomposite Sb/C anode for Na-ion batteries," Chem. Commun. 48, 7070, 2012.
*[d]Senguttuvan et al., "Low-Potential Sodium Insertion in a NASICON-Type Structure through the Ti(III)/Ti(II) Redox Couple," J. Am. Chem. Soc. 135, 3897, 2013; Sun et al., "Direct atomic-scale confirmation of three-phase storage mechanism in $Li_4Ti_5O_{12}$ Anodes for room temperature sodium-ion batteries," Nature Communications, 4, 1870, 2013.

Table 1 indicates that the maximum capacity of the $BC_3$ boron-doped graphene sheet is 762 mAh/g with an average sodiation voltage of 0.44 V for the adsorption of Na on both sides of the $BC_3$ boron-doped graphene sheet. When coupled with a cathode with a voltage of 3.4 V vs Na/Na+(equivalent to 3.7 V vs Li/Li+), the $BC_3$ boron-doped graphene sheet anode provides an energy density ~1.6 times to that of a graphite anode in a lithiuma-ion battery, and ~2.2 times to that of a hard carbon anode in a sodium-ion battery. The high average sodiation voltage of 0.44 V of the $BC_3$ boron-doped graphene sheet anode indicates that this anode material has less safety concerns than the hard carbon anode. When compared with alloy anodes which experience large volume change during cycling, the boron-doped graphene sheet anode barely expands when Na is adsorbed on the 2D-nanosheet. This suggests that the boron-doped graphene sheet shows good cyclability. In addition, the desired properties of a graphene sheet such as open accessible surface area and fast surface diffusion are maintained after the boron doping. Therefore, a boron-doped graphene sheet has high electronic mobility and Na mobility, which suggests this anode material has good rate capability.

All these properties suggest that boron-doped graphene sheet is an excellent anode material for rechargeable sodium-ion batteries. The boron-doped graphene sheet may also contain pre-adsorbed sodium. A schematic illustration of a sodium-ion battery having a boron-doped graphene sheet as an anode active material of the present invention is shown in FIG. 1.

The boron-doped graphene sheet may be obtained via chemical vapor deposition (CVD), spark plasma sintering (SPS), or other chemical or electrochemical doping techniques by using a boron source. The composition of the boron-doped graphene sheet can be represented by the formula $B_xC_y$, where x is a number larger than 0 and less than or equal to 1, and the summation of x and y is 4. In cases where a sodium-ion battery has an anode of a boron-doped graphene sheet with pre-adsorbed sodium, sodium can be pre-adsorbed on a single side or both sides of the boron-doped graphene sheet; and the concentration of the pre-adsorbed sodium is equal to or larger than the concentration of boron, preferably, the concentration of the pre-adsorbed sodium is larger than the concentration of boron. In cases where a boron-doped graphene sheet without pre-adsorbed sodium is used, sodium can be adsorbed on a single side or both sides of the boron-doped graphene sheet during the operation of the battery.

The boron-doped graphene sheet anode may be mixed with other electrically conductive materials and binders. Examples of electrically conductive materials include carbon black and vapor ground carbon fibers. Examples of binders include polyvinylidene fluoride (PVDF), sodium alginate, and sodium carboxymethyl cellulose.

The cathode for sodium-ion batteries is typically composed of a material that can accommodate $Na^+$ reversibly at a voltage greater than 2 V as compared to that of the Na metal. It is important for long-term battery cycling performance that the volume change of the cathode material should be as negligible as possible as it cycles $Na^+$ in and out. Sodium prefers 6-coordination; therefore, polyanionic networks that have octahedral interstitials and layer oxide materials that can hold $Na^+$ in 6-coordinated geometry is preferable.

The cathode active material is not particularly restricted and may be any cathode material suitable for a sodium-ion battery. It can be phosphate based materials such as $NaFePO_4$, $NaVPO_4F$, $Na_3V_2(PO_4)_2F_3$, $Na_2FePO_4F$, and $Na_3V_2(PO_4)_3$; oxides such as $Na_xCoO_2$ wherein x varies in a range of from 0.4 to 1, orthorhombic $Na_{0.44}MnO_2$, layered sodium iron oxides $NaFeO_2$, sodium chromium oxide $NaCrO_2$, layered $NaNi_{0.5}Mn_{0.5}O_2$, and $NaV_6O_{15}$ nanorods; layer sulfides such as $Na_xTiS_2$; perovskite transition metal fluorides such as $NaFeF_3$; $Na^+$ superionic conductor (NASICON)-related compounds, or a mixture thereof.

The cathode active material may be further mixed with conductive additives and binders recognized by one of skill in the art as suitable for sodium-ion batteries. For example, suitable binders may include PVDF, polytetrafluoroethylene (PTFE), styrene butadiene rubber (SBR), and polyimide. Suitable conductive additives may include carbonaceous materials such as acetylene black.

The cathode active material may be present as a sheet, ribbon, particles, or other physical form. An electrode containing the cathode active material may be supported by a current collector. A current collector may include a metal or other electrically conducting material. The current collector may be formed of carbon, carbon paper, carbon cloth or a metal or noble metal mesh or foil.

The electrolyte disposed between a cathode and an anode for a sodium-ion battery is not particularly restricted. It can be Na-based aqueous electrolytes such as $Na_2SO_4$, $NaNO_3$, $NaClO_4$, $Na_3PO_4$, $Na_2CO_3$, and NaOH; sodium salts such as $NaPF_6$ or $NaClO_4$ dissolved in carbonate solvents such as ethylene carbonate, diethyl carbonate, and propylene carbonate; nonaqueous polymer electrolytes such as gel polymer electrolytes; and solid ceramic electrolytes such as sodium β"-alumina solid electrolyte (BASE) ceramic and NASICON compounds. The electrolyte may include additives such as fluoroethylene carbonate (FEC) in order to, for example, improve cycling.

The battery may also include a separator which helps maintain electrical isolation between the cathode and the anode. A separator may include fibers, particles, web, porous sheets, or other forms of material configured to reduce the risk of physical contact and/or short circuit between the electrodes. The separator may be a unitary element, or may include a plurality of discrete spacer elements such as particles or fibers. In some examples, the electrolyte layer may include a separator infused with an electrolyte solution. In some examples such as a polymer electrolyte, the separator may be omitted.

Next, two boron-doped graphene sheets are described as examples of the anode material of the present invention. In particular, calculation results of the performance of the boron-doped graphene sheets in terms of the maximum amount of adsorbed Na, the voltage for the adsorption, and the diffusion of $Na^+$ on the graphene layer are described. It is to be understood that the following examples serve to illustrate the preferred embodiments of the present invention and should not be construed as limiting the scope of the invention.

Example 1: A $B_{0.5}C_{3.5}$ Boron-Doped Graphene Sheet

Figure 2:
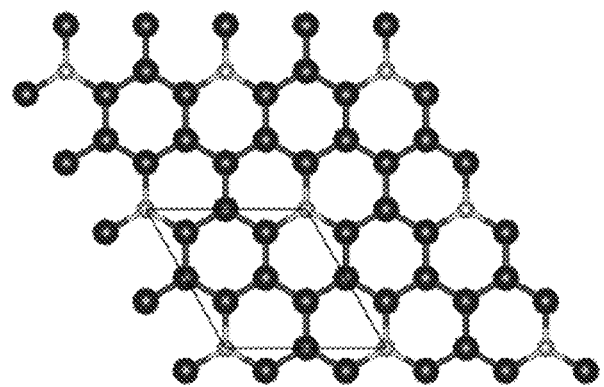
FIG. 2 illustrates a top view of the atomic structure of a two-dimensional (2D) boron-doped graphene sheet ($B_{0.5}C_{3.5}$).

A top view of the atomic structure of the $B_{0.5}C_{3.5}$ boron-doped graphene sheet is shown in FIG. 2. The unit cell is identified by the rhombus. The boron atoms are identified by gray spheres, and the carbon atoms are identified by black spheres.

Figure 3:
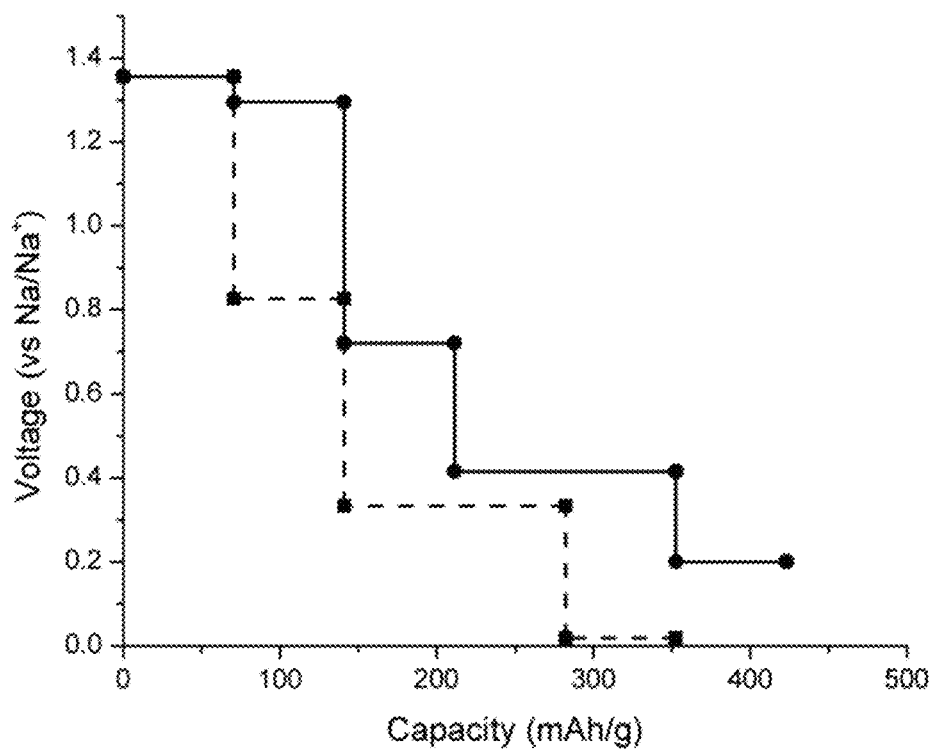
FIG. 3 shows voltages to adsorb Na on a 2D-$B_{0.5}C_{3.5}$ sheet.

FIG. 3 shows the calculated voltages to adsorb Na on a single side (dotted line) and both sides (solid line) of the $B_{0.5}C_{3.5}$ boron-doped graphene sheet as a function of capacity.

For a single-side adsorption, the maximum Na concentration was predicted to be $Na_{0.625}(B_{0.5}C_{3.5})$, which corresponds to a capacity of up to 353 mAh/g. The average voltage for the adsorption of Na (that is, the average sodiation voltage) on a single side of the $B_{0.5}C_{3.5}$ boron-doped graphene sheet was calculated to be around 0.57 V.

For a double-side adsorption, the maximum Na concentration was predicted to be $Na_{0.75}(B_{0.5}C_{3.5})$, which corresponds to a capacity of up to 423 mAh/g. The average sodiation voltage on both sides of the $B_{0.5}C_{3.5}$ boron-doped graphene sheet was calculated to be around 0.73 V.

Example 2: A $BC_3$ Boron-Doped Graphene Sheet

Figure 4:
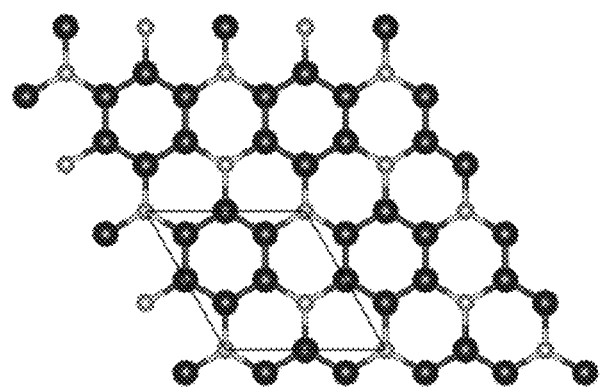
FIG. 4 illustrates a top view of the atomic structure of a 2D boron-doped graphene sheet ($BC_3$).

A top view of the atomic structure of the $BC_3$ boron-doped graphene sheet is shown in FIG. 4. The unit cell is identified by the rhombus. The boron atoms are identified by gray spheres, and the carbon atoms are identified by black spheres.

Figure 5:
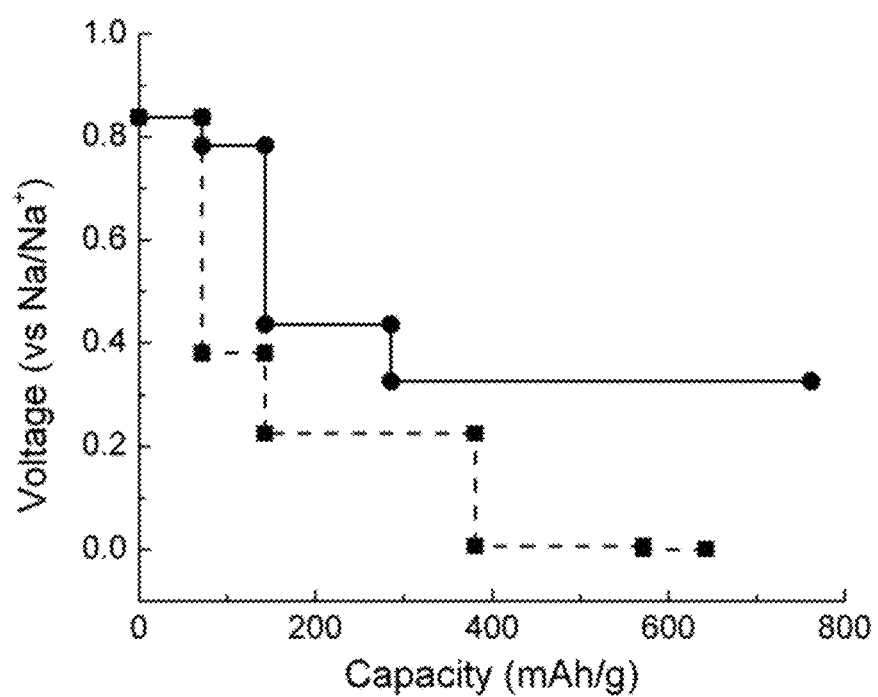
FIG. 5 shows voltages to adsorb Na on a 2D-$BC_3$ sheet.

FIG. 5 shows the calculated voltages to adsorb Na on a single side (dotted line) and both sides (solid line) of the $BC_3$ boron-doped graphene sheet as a function of capacity.

For a single-side adsorption, the maximum Na concentration was predicted to be $Na_{1.125}(BC_3)$, which corresponds to a capacity of up to 648 mAh/g. The average sodiation voltage on a single side of the $BC_3$ boron-doped graphene sheet was calculated to be around 0.26 V.

For a double-side adsoprtion, the maximum Na concentration was predicted to be $Na_{1.33}(BC_3)$, which corresponds to a capacity of up to 762 mAh/g. The average sodiation voltage on both sides of the $BC_3$ boron-doped graphene sheet was calculated to be around 0.44 V.

Figure 6:
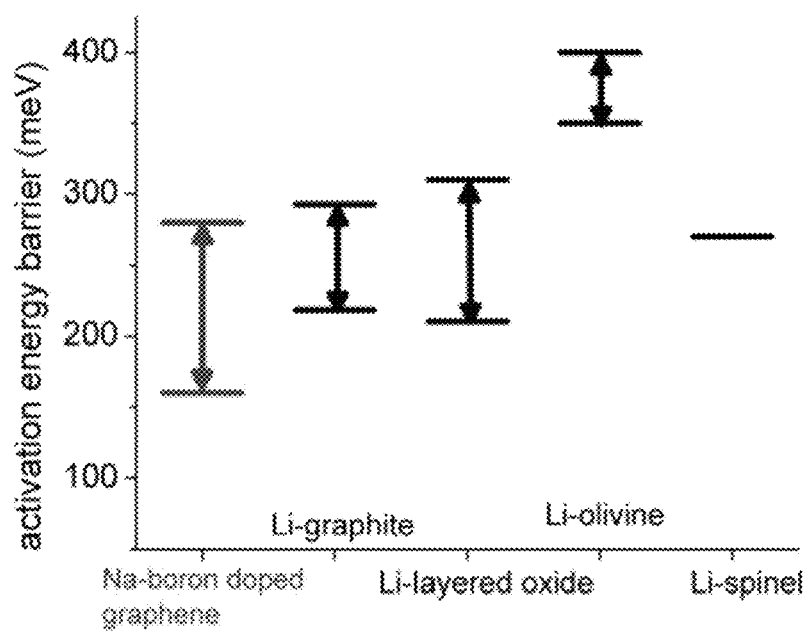
FIG. 6 compares the activation energy barriers for the diffusion of Na on boron-doped graphene sheets and Li on various anode materials typically used in lithium-ion batteries.

The diffusion of Na on both the $B_{0.5}C_{3.5}$ boron-doped graphene sheet and the $BC_3$ boron-doped graphene sheet was assessed by calculating the activation energy barrier for Na migration at different Na concentrations. All the calculated barriers were in the range of 0.16-0.28 eV. These values were compared with Li diffusion barrier in typical lithium-ion battery anodes, as reported by Persson et al. in "Thermodynamic and kinetic properties of the Li-graphite system from first-principles calculations," Phys. Rev. B, 82, 125416, 2010 and Meng et al. in "First principles computational materials design for energy storage materials in lithium ion batteries," Energy Environ. Sci. 2, 589, 2009. FIG. 6 summarizes the comparison result and shows that Na diffusion barrier in boron-doped graphene sheets is comparable to or even lower than Li diffusion barrier in those typical lithium-ion battery electrodes. Therefore, boron-doped graphene sheets have good rate capability as a sodium-ion battery anode.

Although the present invention has been described in considerable detail with reference to certain preferred embodiments hereof, other embodiments are possible. For example, the concentration of boron can be varied; the boron-doped graphene can also be doped with other elements such as Si, P, N, and S; multiple boron-doped graphene sheets with the same or different boron concentration may be used; and the boron-doped graphene sheet can be coupled with other anode active materials suitable for sodium-ion batteries. Therefore, the spirit and scope of the appended claims should not be limited to the description of the preferred embodiments contained herein.

The invention claimed is:

1. A sodium-ion battery, comprising:
an anode comprising a boron-doped graphene sheet represented by a formula of $B_{0.5}C_{3.5}$;
a cathode; and
an electrolyte comprising a sodium salt;
wherein the cathode comprises a sodium ion active material selected from the group consisting of $NaFePO_4$, $NaVPO_4F$, $Na_3V_2(PO_4)_2F_3$, $Na_2FePO_4F$, and $Na_3V_2(PO_4)_3$; $Na_xCoO_2$ wherein x varies in a range of from 0.4 to 1; orthorhombic $Na_{0.44}MnO_2$, $NaFeO_2$, $NaCrO_2$, layered $NaNi_{0.5}Mn_{0.5}O_2$, $NaV_6O_{15}$ nanorods, $Na_xTiS_2$; perovskite transition metal fluorides, $Na^+$ superionic conductor (NASICON)-related compounds, and mixtures thereof.

2. The sodium-ion battery of claim 1, wherein sodium adsorption occurs on a single side or both sides of the boron-doped graphene sheet.

3. The sodium-ion battery of claim 2, wherein the sodium adsorption occurs on a single side of the boron-doped graphene sheet; and
a maximum concentration of sodium adsorbed on the single side of the boron-doped graphene sheet is $Na_{0.625}(B_{0.5}C_{3.5})$.

4. The sodium-ion battery of claim 2, wherein the sodium adsorption occurs on both sides of the boron-doped graphene sheet; and
a maximum concentration of sodium adsorbed on both sides of the boron-doped graphene sheet is $Na_{0.75}(B_{0.5}C_{3.5})$.

5. The sodium-ion battery of claim 1, wherein the boron-doped graphene sheet comprises pre-adsorbed sodium ions.

6. The sodium-ion battery of claim 5, wherein the pre-adsorbed sodium ions are adsorbed on a single side or on both sides of the boron-doped graphene sheet.

7. The sodium-ion battery of claim 5, wherein a concentration of the pre-adsorbed sodium ions is equal to or larger than a concentration of boron.

8. The sodium-ion battery of claim 6, wherein the pre-adsorbed sodium ions are adsorbed on a single side of the boron-doped graphene sheet; and
a maximum concentration of sodium ions pre-adsorbed on the single side of the boron-doped graphene sheet is $Na_{0.625}(B_{0.5}C_{3.5})$.

9. The sodium-ion battery of claim 6, wherein the pre-adsorbed sodium ions are adsorbed on both sides of the boron-doped graphene sheet; and
a maximum concentration of sodium ions pre-adsorbed on both sides of the boron-doped graphene sheet is $Na_{0.75}(B_{0.5}C_{3.5})$.

* * * * *